July 26, 1932.     A. ANDERSON     1,868,558
TENSION DEVICE
Filed Sept. 24, 1926     2 Sheets-Sheet 1
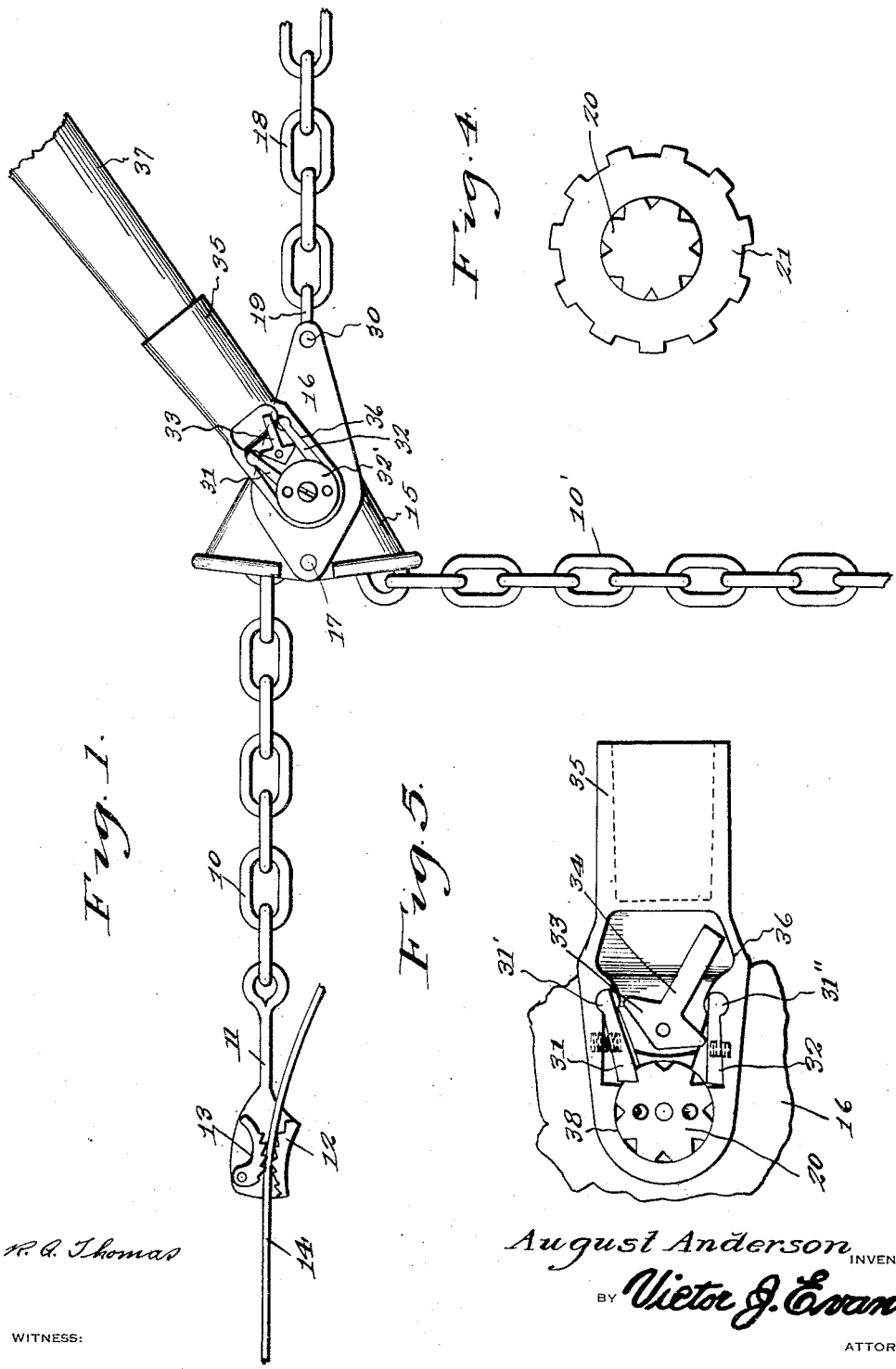
August Anderson INVENTOR
BY Victor J. Evans
ATTORNEY July 26, 1932.　　　A. ANDERSON　　　1,868,558
TENSION DEVICE
Filed Sept. 24, 1926　　2 Sheets-Sheet 2
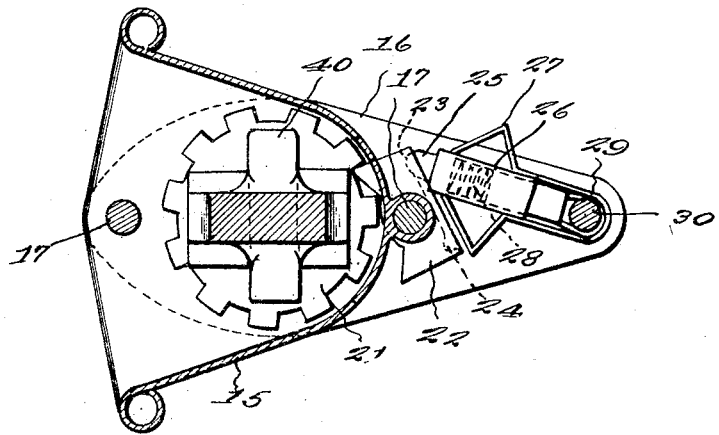
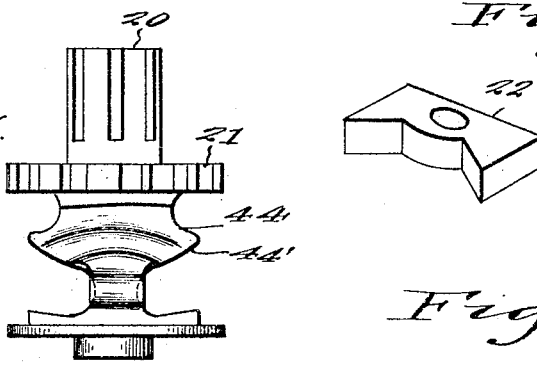
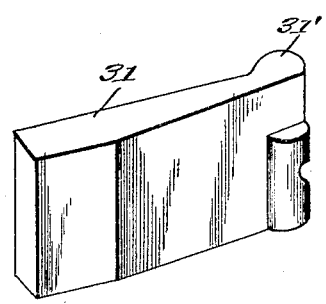
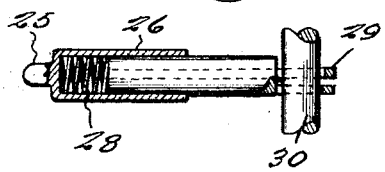

Patented July 26, 1932

1,868,558

UNITED STATES PATENT OFFICE

AUGUST ANDERSON, OF SHOSHONI, WYOMING; IDA ANDERSON ADMINISTRATRIX OF SAID AUGUST ANDERSON, DECEASED

TENSION DEVICE

Application filed September 24, 1926. Serial No. 137,555.

The object of this invention is to produce tension on fence wire and on chains or other similar elements, and to produce lever and ratchet mechanism especially adapted for use in hoisting apparatus and the like.

A further object is to provide reversible lever and ratchet mechanism, and a wheel of special construction, adapted to engage a plurality of the links of a chain, at the same time, the links being guided or directed by positive means insuring the correct position thereof.

A further object is to provide special retaining means.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 is a view of the device in elevation.

Figure 2 is a section longitudinally of the housing.

Figure 3 shows the rotatable means, detached.

Figure 4 is an end view, looking from the upper portion of Figure 3.

Figure 5 is a view of the reversible ratchet mechanism, in elevation.

Figure 6 is a perspective view of an element described below.

Figure 7 is a perspective view of the tooth engaging device of Figure 2.

Figure 8 is a section thru the spring controlled means of Figure 2.

It being understood that the device is adapted for use in connection with any hoisting or stretching operation, I have illustrated for convenience, in Figure 1, a chain 10 having connection at one end with a shank 11, of a gripping device which may include a stationary segmental portion 12, and a pivoted toothed member 13. The wire or other element to be engaged and stretched is caught between elements 12 and 13 and is held when tension is applied to the chain 10.

This chain 10 passes around a rotatable element within the housing 15, and the other end of the chain is designated 10'.

The housing 15 is mounted between the side plates 16, the latter being connected by transverse bolts or the like 17, and a chain 18 being secured to a link or eye member designated 19.

The rotatable means includes an element 20 which will be termed a ratchet wheel, and further includes the wheel 21 provided with square or other form of teeth, adapted for engagement by a pivoted retaining device 22, the latter being adapted for movement from the position of Figure 2 to a position where the opposite end of element 22 engages with the teeth of the wheel 21. When thus moved either of the recesses 23 or 24 is engaged by a spring controlled element such as 25 carried on a tubular device 26 movable manually by means of arms 27 against the action of spring 28. A U-portion 29 is connected with the tubular element 26 and the bolt 30 passes thru this element 29.

By means of the construction just referred to, the retaining device 22 is caused to engage the wheel 21, either in the position of Figure 2 or in the opposite position referred to.

The ratchet wheel 20 is engaged by either one of the spring-held pawls 31, 32, and the particular pawl in service depends upon the position of the pivoted controlling device 33 including a shank portion or handle 34. This device is adapted to be manually shifted, and to throw either one of the pawls out of action.

The operating device includes the handle 37 adapted to enter socket 35, the portion 36 thereof being recessed for the accommodation of the pawls and the element 33. This operating element including the socket portion 35 and the portion 36 is mounted on the outer side of plate 16, as shown in Figure 1, and the ratchet element or wheel 20 projecting thru plate 16 also passes thru the apertured portion of element 36, this aperture or opening being designated 38. The handle 37 and the operating devices connected therewith are adapted for movement in the same manner as the lever of a particular type of lifting jack.

The chain 10 is adapted to pass over a particular form of wheel including the element 40, so that a plurality of adjacent links of the chain will be engaged, and a maximum effect will be produced thereon, for tensioning purposes. The flange 44 may be provided with an angular portion at 44', and the oppositely located flange also aids in guiding the chain, the latter maintaining a correct position, so that it is practically impossible for any false engagement to result.

When the limit of movement of the chain in one direction has been reached, the spring-held element 25 is manually shifted to the other end of the locking dog 22, thus holding the latter until pawl 31 or 32 releases, and the other pawl automatically engages on the other side of the ratchet wheel. The lever mechanism is then operated as before. The pawls carry enlargements 31', 31" loosely received by the adjacent socket portions shown by the drawings, the pawls being held by disk 32'.

Having described the invention what is claimed is:—

In a device of the class described, a housing, a rotatable device mounted therein and including a ratchet wheel, feeding pawls for engaging the ratchet wheel, devices for moving the pawls to operative position, means for moving either pawl to inoperative position, means carried by the rotatable device for engaging a plurality of adjacent links of a chain when the links are in different angular positions, a locking dog pivoted in the housing in position for retaining the rotatable device independently of the pawls, one end of the dog being released when the other end engages the rotatable element, and both ends being recessed, means for pivoting the dog between the recessed portion, and means adapted to engage either recess and throw the adjacent end of the dog into engagement with the rotatable element.

In testimony whereof I affix my signature.

AUGUST ANDERSON.